(12) United States Patent
Puniello et al.

(10) Patent No.: US 7,341,687 B2
(45) Date of Patent: Mar. 11, 2008

(54) METHOD OF FORMING A GOLF BALL

(75) Inventors: Paul A. Puniello, Bristol, RI (US); Robert A. Wilson, Sagamore, MA (US)

(73) Assignee: Acushnet Company, Fairhaven, CT (US)

( * ) Notice: Subject to any disclaimer, the term of this patent is extended or adjusted under 35 U.S.C. 154(b) by 374 days.

(21) Appl. No.: 11/099,495

(22) Filed: Apr. 6, 2005

(65) Prior Publication Data

US 2005/0173832 A1    Aug. 11, 2005

Related U.S. Application Data

(62) Division of application No. 09/742,435, filed on Dec. 22, 2000, now Pat. No. 6,877,974.

(51) Int. Cl.
*B29C 45/14* (2006.01)

(52) U.S. Cl. .................... 264/278; 264/279.1; 264/335

(58) Field of Classification Search .................... None
See application file for complete search history.

(56) References Cited

U.S. PATENT DOCUMENTS

| | | | |
|---|---|---|---|
| 2,378,586 A | 6/1945 | Schultz ........................ 425/812 |
| 3,946,595 A | 3/1976 | Carlson ........................... 73/37 |
| 4,009,978 A * | 3/1977 | Hanning ....................... 425/98 |
| 4,083,903 A | 4/1978 | Gilbert et al. .............. 264/40.3 |
| 4,613,110 A | 9/1986 | Rose .......................... 249/141 |
| 4,795,331 A | 1/1989 | Cain et al. .................. 425/812 |
| 4,874,308 A | 10/1989 | Atlas et al. ................ 425/544 |
| 4,923,666 A | 5/1990 | Yamazaki et al. .......... 264/572 |
| 5,248,457 A | 9/1993 | Brasel et al. ................. 264/39 |
| 5,397,230 A | 3/1995 | Brew .......................... 425/546 |
| 5,454,991 A | 10/1995 | Brew ........................... 264/39 |
| 5,458,473 A | 10/1995 | Banji ......................... 425/116 |
| 5,766,654 A | 6/1998 | Groleau ...................... 425/555 |
| 5,849,237 A | 12/1998 | Inoue .......................... 264/319 |
| 5,874,116 A | 2/1999 | Takano ....................... 425/542 |
| 5,879,599 A | 3/1999 | Inoue et al. ................ 264/102 |
| 5,890,975 A | 4/1999 | Stiefel ........................ 473/384 |

(Continued)

FOREIGN PATENT DOCUMENTS

JP            01301219 A       12/1989

(Continued)

OTHER PUBLICATIONS

Mechanical Engineer's Handbook, Myer Kutz ed., John Wiley & Sons, Inc., §§ 31.3-31.6 (1986).

(Continued)

*Primary Examiner*—Edmund H. Lee
(74) *Attorney, Agent, or Firm*—Bingham McCutchen LLP

(57) ABSTRACT

The present invention is directed to an apparatus and method for venting trapped air and gasses in a mold. The mold and method comprise or use at least one pin formed from multiple pin sections. When assembled, the pin sections provide space on the interior of the pin through which trapped air and gasses can escape from the mold. The present invention may also be used to assist in ejecting an object from the mold. The pins can have circular or non-circular cross-sections and also may have dimple-forming projections to conform to a golf ball dimple pattern.

11 Claims, 6 Drawing Sheets

U.S. PATENT DOCUMENTS

| | | | |
|---|---|---|---|
| 6,050,803 A | 4/2000 | Omura et al. | 425/116 |
| 6,129,881 A | 10/2000 | Puniello | 264/278 |
| 6,319,451 B1 | 11/2001 | Brune | 264/278 |
| 6,367,765 B1 | 4/2002 | Wieder | 249/141 |
| 6,817,852 B2 * | 11/2004 | Lavallee | 425/116 |
| 2002/0096801 A1 | 7/2002 | Puniello et al. | 425/125 |

FOREIGN PATENT DOCUMENTS

| | | | |
|---|---|---|---|
| JP | 7080848 | | 3/1995 |
| JP | 8300403 | | 11/1996 |
| JP | 08300403 A | | 11/1996 |
| JP | 08323772 A | | 12/1996 |
| JP | 2003-266440 | * | 9/2003 |

OTHER PUBLICATIONS

Marks' Standard Handbook for Mechanical Engineers, Eugene A. Avallone et al., eds., 9th ed., §§ 13.4-13.5 (1978).

* cited by examiner

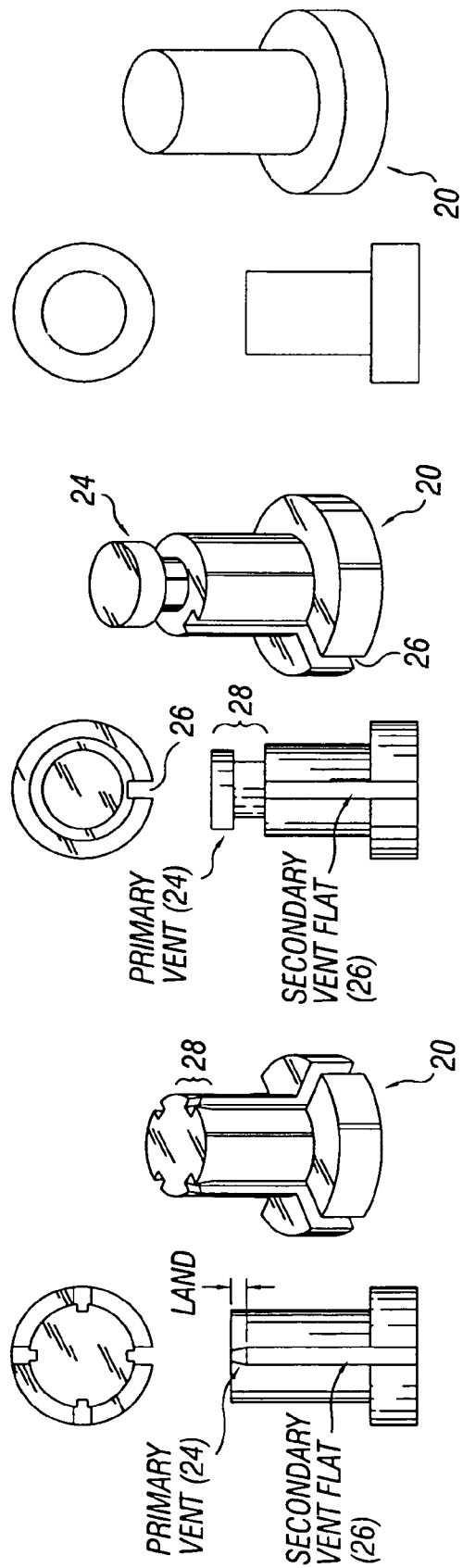

METHOD OF FORMING A GOLF BALL

This application is a division of U.S. application Ser. No. 09/742,435 filed on Dec. 22, 2000, now U.S. Pat. No. 6,877,974.

FIELD OF INVENTION

The present invention relates to venting methods and an apparatus for use in golf ball injection molding systems. In particular, the present invention provides greater capacity for releasing trapped air and gasses from a mold cavity during the injection molding process and for injecting air back into the cavity to assist in ejecting the ball upon completion of the molding process.

BACKGROUND OF THE INVENTION

The conventional method of forming an intermediate layer or cover layer of a golf ball utilizes an injection mold having two mold plates with hemispherical cavities that mate to form a spherical mold cavity when the mold halves are joined. At the initial stage of the injection molding process, a golf ball core is supported centrally within the mold cavity by a plurality of retractable pins near the upper and lower poles of the mold cavity so as to leave a space around the core for forming an intermediate layer or cover layer. A thermoplastic or thermosetting material then is injected into the mold cavity near the equator of the mold. FIG. 1 illustrates a conventional golf ball injection mold cavity.

Conventional golf ball injection molds also include vents near the upper and lower poles of the mold cavity, near the last part of the mold cavity filled by injected layer material. The air and gasses inside the mold cavity normally are evacuated by natural ventilation through clearances between a vent pin 20 and the wall of a vent pin hole 22 in the mold plate. If the newly formed layer is a cover layer, the vent pin also is preferably located at a dimple location so that the pin forms the dimple.

As shown in FIGS. 2A-C, a conventional vent pin 20 may be configured with a primary vent 24 and a secondary vent 26 on the outer surface of the vent pin. The primary vent is located at the tip 28 of the vent pin that forms part of the mold cavity wall and is sufficiently narrow to prevent injected material from forming flash on the newly formed layer, while the secondary vent 26 typically has a wider and deeper opening so that trapped air and gasses are more readily released from the mold after escaping from the mold cavity through the primary vent 24.

A conventional primary vent may have a flat side formed on the edge of the tip that is wide enough to allow trapped air and gasses to escape the mold cavity but narrow enough to prevent the forming of flash on the newly formed layer. Alternatively, as shown in FIG. 2B, the outer diameter of the vent pin tip may be such that a thin circular gap 30 is created between the tip of the vent pin 28 and the wall of the pin hole 22. FIG. 2C illustrates that vent pins also may be made of porous metal having open pores that are large enough to allow air and gasses to pass through them but small enough to prevent flash from forming. Alternatively, the tip of the pin may be made of porous material in fluid connection with a secondary vent. After passing through this narrow opening or porous material at the tip of the vent pin, the air and gasses are released from the mold through the secondary vent.

In addition to ventilating air and gasses through vents in the mold, some trapped air and gasses also may escape the mold cavity through clearances between the retractable pins 32 and the retractable pin holes 34 in the mold plates 36. The release of air and gasses in this manner, however, is significantly less than the amount of air and gasses that escape through a vent because of the differences in design and positioning of a retractable pin in comparison to a vent pin. In particular, retractable pins do not have flats on the portion of the pin facing the equator of the ball, nor do they utilize a porous metal tip because doing so may cause the pins to bend or spread, thereby adversely affecting the ability of the retractable pins to accurately and securely position the ball core in the mold cavity during the injection process. Moreover, because retractable pins are located in the mold in order to securely hold the core in place, the material filling the mold cavity typically covers this portion of the mold well before the injection process is complete. Thus, air and gasses may escape through the retractable pins for only a portion of the injection process.

Despite that conventional vent pins are configured with primary and secondary vents or porous tips to increase ventilation capacity, ventilation of trapped air and gasses inside the mold often remains a limiting factor in the speed at which material is injected into the mold cavity. If the vent holes are too small, poor ventilation can cause improper or inadequate venting of trapped air and gasses from the mold cavity during injection, which can have a deleterious effect on both the visual quality and durability of the newly formed layer. If the injection speed of the material is too fast, the speed of evacuating air and gasses out of the mold cavity during the injection process can cause the newly formed layer to scorch or not completely fill the mold cavity. Conversely, if the vent holes are too large, the injected material flows thereinto and forms flash on the newly formed layer, thereby requiring substantial additional processing for removal of the flash and surface finishing.

One solution to the problem of inadequate venting is to reduce the injection speed of the material. While lengthening the time for injecting material into the mold does provide better correspondence between the rate of ventilation of air and gasses and the rate at which the mold cavity fills with layer material, the reduction of injection speed also may reduce the ability of material injected from any one injection gate to intermix and weld together with material injected from neighboring gates, which may reduce the durability of the layer and useful life of the ball. Moreover, reducing injection speed also results in lower overall production capacity due to the increased injection time.

The use of porous material as a vent presents additional disadvantages. For instance, the pores eventually become blocked by contaminates over time through use, thereby reducing the capacity of the vent trapped air and gasses. The diminishing ventilation capacity may require corresponding reductions of the injection speed of the material to avoid the problems that may result from inadequate ventilation. These frequent adjustments can be time consuming and significantly reduce ball manufacturing capacity due to increased downtime. Moreover, cleaning the porous metal to remove contaminates blocking the pores also can be time-consuming and expensive. When the porous metal becomes overly blocked by contaminates, the metal must be cleaned with a solvent ultrasonic bath or by controlled pyrolosis methods such as a burn off oven or fluidized bed.

Vents also may be used to assist in the ejection of the ball from the mold after completing the injection molding cycle. Typically, the retractable pins of the golf ball mold are struck by an ejector bar that causes the retractable pin tips to strike the surface of the ball and eject it from the mold cavity. If the ejection force imparted on the retractable pins is too high, the faces of the pins may deform the newly formed layer as they strike the surface of the ball. In addition, the ejection force imparted on the retractable pins may cause the pins to bend or spread over time, particularly if the ejection force imparted on the pins is high. Both of these problems are alleviated by forcing air through the vents into the mold cavity during ejection in order to reduce the amount of ejection force needed from the retractable pins to remove the ball from the mold. Increasing air blow volume through the vents would further alleviate these potential problems by further reducing the amount of ejection force needed from the retractable pins to remove the ball.

SUMMARY OF THE INVENTION

One advantage of the present invention is that it may provide greater control and capacity of the evacuation of air and gasses in an injection mold cavity even when the injected material is molded with a high injection speed.

One embodiment of the present invention is a vent pin made of a plurality of pin sections with faces that join to define at least one primary vent along the inside of the tip of the vent pin. In another embodiment, the faces of the vent pin sections have a plurality of apertures on the portion of the vent pin facing inside the mold cavity. In yet another embodiment, the pin sections further include a secondary vent in fluid communication with the primary vent. In a preferred embodiment, the secondary vent is located inside the vent pin, although in another embodiment the secondary vent is located on the outer surface of the vent pin.

In another embodiment, the tip of the vent pin is shaped to form a plurality of dimples in the cover of a golf ball. In a preferred embodiment, the vent pin is shaped to include four protrusions for forming dimples on the object, while in another embodiment the vent pin has six protrusions. In yet another embodiment, the primary vent is formed by a channel cutout in one pin section joined with a second pin section having an essentially planar face.

Another embodiment of the present invention further includes a second primary vent and a secondary vent. Preferably, the two primary vents of this embodiment are in fluid connection with the secondary vent. In yet another embodiment, each primary vent is in fluid communication with a secondary vent. In another embodiment, the secondary vent may be defined along the outer surface or inner portion of the vent pin.

In one embodiment, the face of at least one pin section may be roughened or textured so that air and gasses may pass therethrough when the pin sections are joined. In another embodiment, the face of at least one pin section forms a channel cutout. In these embodiments, the faces of the other pin sections also may be roughened, have a channel cutout, or have an essentially planar face.

In another embodiment, the vent pin forms part of a golf ball injection mold. The present invention also can be used for retractable pins. The embodiments of the present invention described above with respect to vent pins also may be used to for retractable pins. In one embodiment, the pin sections of the retractable pin may be welded. In another embodiment, the retractable pin may be formed of two sections having joining faces. In this embodiment, the joining faces of the two pin sections are approximately in a plane that travels through the poles of the ball.

Another embodiment of the present invention is a method of forming a golf ball layer utilizing a split vent pin or retractable pin. In one embodiment, air or other gasses are forced back into the mold after the layer is formed in order to assist in ejecting the object from the mold. In one embodiment, the air or gas is forced through a split vent pin, while in another the air or gas is forced through at least one retractable pin. In yet another embodiment, retractable pins are used to strike the surface of the object to assist in ejecting the object from the mold.

BRIEF DESCRIPTION OF THE DRAWINGS

FIGS. 2A and 2B illustrate conventional vent pins with primary vents formed at the tip of the pin.

FIG. 2C illustrates a vent pin formed of porous material.

DETAILED DESCRIPTION OF THE INVENTION

Figure 1:
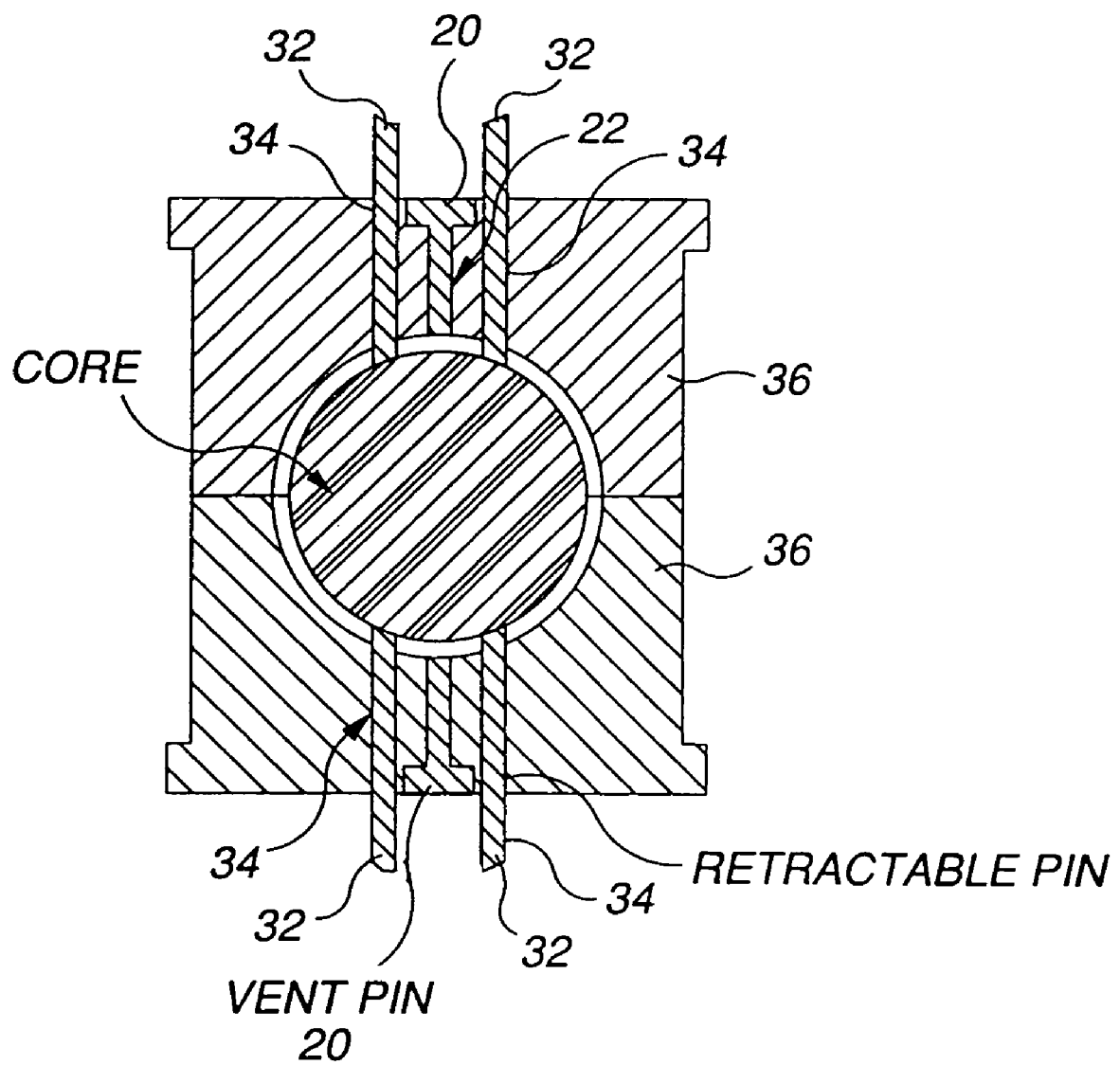
FIG. 1 illustrates a cross-sectional view of a conventional golf ball injection mold having mold plates 36 that join to form a spherical cavity. The mold has vent pins 20 inserted in vent pin holes 22 and retractable pins 32 inserted in retractable pin holes 34 in the mold plates.

FIGS. 2A-C illustrate how ventilation of air and gasses from an injection mold cavity has been achieved by utilizing solid vent pins that are relieved on the side or by using porous material to form the vent pin. As described above, these conventional configurations present limitations in ventilation capacity and may also require increased maintenance.

Under the present invention, the pin sections 44 may be constructed from two solid pins having typical geometry for a golf ball injection mold as illustrated in FIGS. 2A and 2B. Material from the first solid pin is removed longitudinally leaving a remaining piece that is approximately half cylindrical in cross section. The second pin is machined in a similar manner so that when the two sections are joined along their respective faces 46 and 48 they form a pin having outer dimensions approximating the dimensions of a solid pin.

After forming the pin section, a primary vent is constructed on its interior face 46 near the tip of pin. In one embodiment, both pin sections are shaped with grooves, indentations or other surface treatment to form the vent when the faces are joined together. In another embodiment, one pin section is modified to form the vent while the other pin section is not modified. One advantage gained from this alternative embodiment is a reduction in manufacturing costs.

The primary vent may be constructed by any suitable method for forming the desired shape of the vent. For example, the vent may by made by grinding the face of the pin section to form grooves or other indentations corresponding to the desired vent geometry. The vent also may be formed by utilizing wire or conventional EDM to make grooves or shapes in the face of the pin section corresponding to the desired geometry of the vent. In addition, the faces of the pin sections may simply be textured or roughened such that the faces of the pin sections join in a manner that the uneven surface of the face or faces causes a gap through which trapped air and gasses may escape. In this embodiment, increasing the number of pin sections would further increase the capacity of the pin to vent trapped air and gasses because of the increased surface area on the faces of the pin sections that allow air and gasses to pass through.

Any suitable method for texturing or roughening the faces of the pin sections is acceptable. These methods include, for example, electrical-discharge machining, electrical-discharge wire cutting, sandblasting or chemical etching of the surface. These and other suitable methods are described in standard handbooks of the trade, such as *Mechanical Engineer's Handbook* at §§ 31.3 to 31.6 (Myer Kutz ed., John Wiley & Sons, Inc. 1986) and *Marks' Standard Handbook for Mechanical Engineers* at §§ 13.4 & 13.5 (Eugene A. Avallone et al. eds., 9th ed., 1978). The roughening of the surface provides for venting along the interior of the pin in a manner similar to porous metal without the added cost of porous metal and without the additional burden of higher maintenance, increased downtime and cleaning costs. The degree of roughening of the pin section surface can be specified depending upon the method used to form the roughened surface. For instance, EDM surface finish can be described according to the Charmilles scale. Chemical etching can be described by texture ID number or type, such as is provided by Mold-Tech, Inc., 317 Meadow Street, Chicopee, Mass. 01013. Likewise, the textured surface made according to sandblasting can be controlled by the grit size used in the sandblasting process.

FIGS. 3A-D and 4A-D show several embodiments of the present invention. The present invention increases ventilation capacity of an injection mold by utilizing a split vent pin 40 that is comprised of at least two sections 42 and 44 that join to form a pin having the capacity to vent trapped air and gasses through the interior of the assembled pin. The interior faces 46 and 48 of the split vent pin halves are configured so that when assembled (FIGS. 4A-D) the interior faces 46 and 48 form a vent on the interior of the vent pin 40.

Figure 3A:
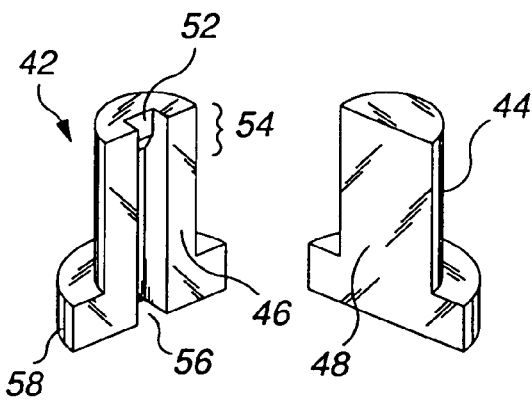
FIGS. 3A-D are unassembled split vent pins according to the present invention.
Figure 4A:
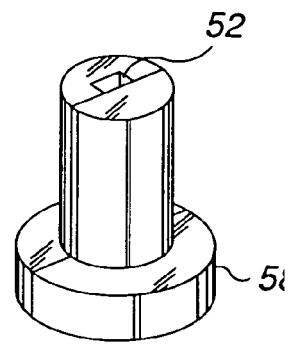
FIGS. 4A-D are assembled split vent pins according to the present invention.

FIG. 3A shows one embodiment of a split vent pin having a rectangular primary vent 52 formed on the interior portion of pin tip 54. The primary vent 52 is in fluid connection with secondary vent 56 that is also formed on the interior of pin tip 54 and extends from the primary vent 52 to the base 58 of the vent pin. In this embodiment, the secondary vent is a squared channel, although the shape of the secondary vent is not critical to the invention and therefore may have any desired shape without departing from the present invention. In an alternative embodiment, the primary vent may extend from the tip 54 of the pin to the base 58 to release air and gasses. The face of the second pin section 44 may be configured with corresponding indentations to form the primary and/or secondary vent or, as shown in FIG. 3A, may be an approximately flat surface. Although not essential to the invention, in the preferred embodiment illustrated in FIG. 4A the primary vent is contained within the interior of the assembled vent pin.

Figure 3B:
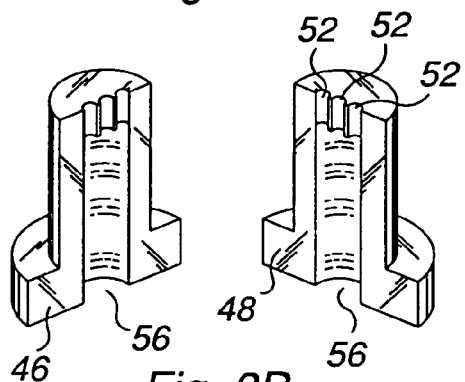
Figure 4B:
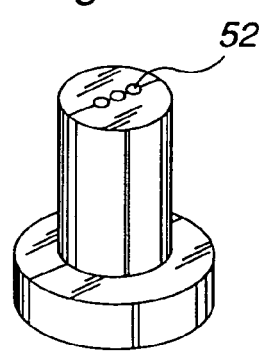

FIG. 3B illustrates an embodiment where a plurality of rounded apertures form primary vents 52 on the interior of the vent pin. While the shape of the primary vent is not critical to the invention and may be varied to suit a particular preference or purpose of the user, it is preferred that the opening of the primary vent be sufficiently narrow as to prevent the formation of flash by the injected layer material. More particularly, it is preferred that the opening of the primary vent that faces into the mold cavity be less than approximately 0.002 inches wide in at least one direction, and more preferably less than about 0.002 but greater than about 0.0004 inches. For example, it is preferred that the width of the rectangular the primary vent shown in FIG. 3A be less than 0.002 inches, although the length of the vent may be considerably longer. Similarly, it is preferred that the diameter of the rounded primary vents shown in FIG. 3B be less than 0.002 inches. In this embodiment both pin sections have indentations that form the primary vents 52 and secondary vent 56 on the interior of the split vent pin. In this embodiment the secondary vent is also rounded to further illustrate that the secondary vent may have a variety of shapes.

Figure 3C:
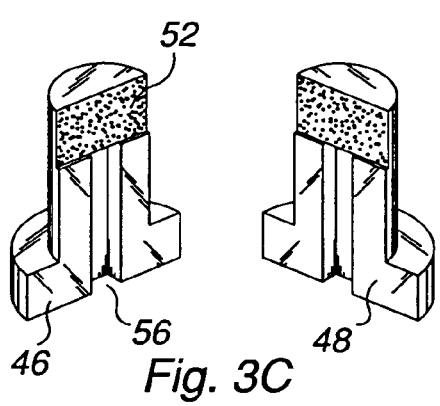
Figure 3D:
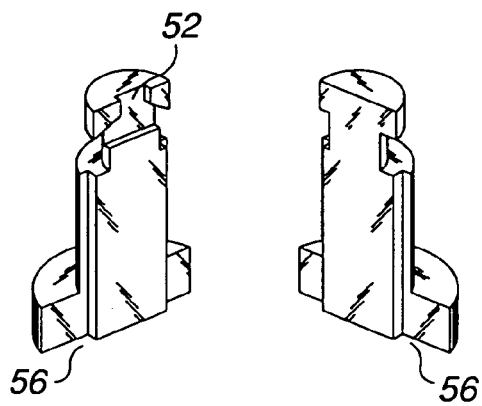
Figure 4D:
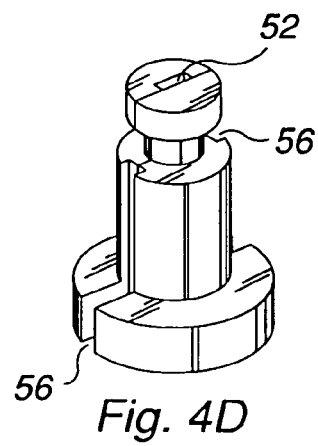

FIG. 3C shows yet another embodiment of the present invention wherein the primary vent is formed by roughening and/or texturing the faces of the pin sections near the tip of the vent pin. In one embodiment, the roughened and/or textured primary vent is in fluid connection with a secondary vent. In each embodiment shown in FIGS. 3A-D, the secondary vent may be disposed on the interior of the vent pin, such as shown in FIG. 3C, or may be disposed on the surface of the vent pin, as shown in FIG. 3D. In addition, the vent pin may have secondary vents on both the interior and outer surface of the vent pin.

Figure 4C:
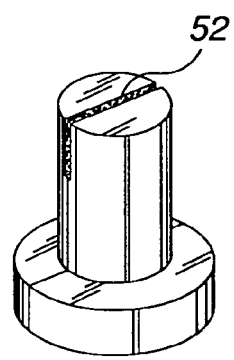

FIG. 4C illustrates an assembled vent pin having the features of the embodiment shown in FIG. 3C. When joined, the roughened and/or textured faces of the pin sections allow trapped air and gasses to pass therethrough. Alternatively, the roughened and/or textured surface may extend from the tip of the pin to base. Surface treatment of the faces of the pin sections may be accomplished in any manner known to those skilled in the art, examples of which are provided in further detail below.

FIG. 3D illustrates a split vent pin having a primary vent pin 52 on the interior of the assembled pin that is in fluid connection with a plurality of secondary vents on the outer surface of the vent pin. In this embodiment the exterior edges of the pin section faces are cut to form secondary vents. It should be noted that secondary vents also may be formed at other locations on the surface of the split vent pin or additionally on the interior of the split vent pin. The embodiment shown also utilizes a circular primary vent along the outer edge of the tip of the vent pin similar to the vent shown in FIG. 2B. Thus, ventilation capacity can be further increased by combining the primary vent 52 on the interior of the vent pin with available conventional primary venting technology, such as the use of flats or dimetrical vents. As would be appreciated by one skilled in the art, the combination of interior primary venting of the present invention with conventional venting on the outer surface of the vent pin can greatly increase ventilation capacity of a vent pin.

Figure 6:
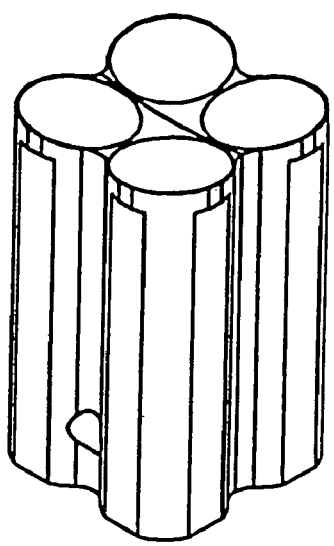
FIG. 6 is a perspective view of an alternative embodiment of an enlarged split vent pin according to the present invention.
Figure 7A:
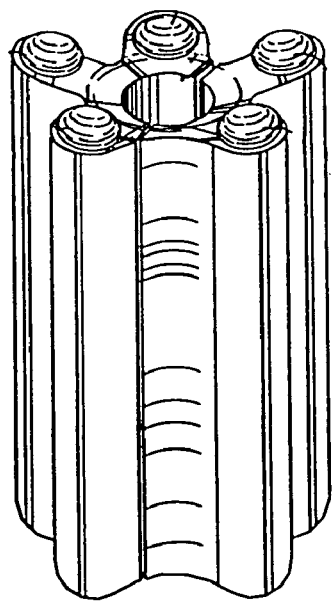
FIGS. 7A and 8A are perspective views of various alternative embodiments of vent pins according to the present invention.
Figure 7B:
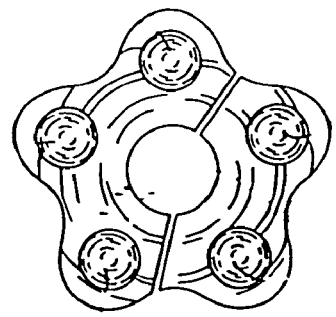
FIGS. 7B and 8B are top views of the vent pins shown in FIGS. 7A and 8A, respectively.

In yet another embodiment of the present invention for use in forming a ball cover, the vent pin is enlarged from an area that approximately corresponds to the size of a single dimple on the ball to an area that forms a plurality of dimples. As shown in FIG. 6, for example, the vent pin may include a plurality of substantially cylindrical segments that are joined together so that the cross-sectional shape of the pin between the ends along the cylindrical segments is non-circular. Each of the segments includes projections that form four dimples on the ball.

Figure 8A:
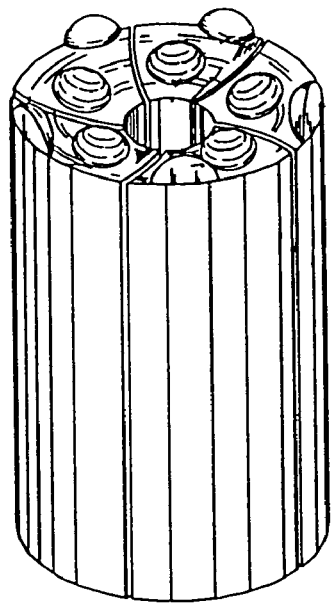
Figure 8B:
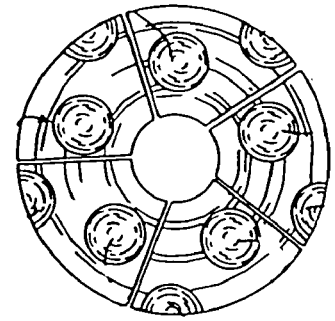

One skilled in the art would appreciate that the vent pin may have any number of other shapes, such as an enlarged cylinder, a shape that forms six dimples corresponding to an icosahedron dimple pattern (five dimples surrounding a centrally positioned dimple) or a plurality dimple shapes corresponding to any other dimple pattern. Moreover, the pin need not be split such that each component part is symmetrical to the other component parts. Examples of such variations are illustrated in FIGS. 7A-B and 8A-B. As seen in FIGS. 8A-B, the enlarged vent pin also may form only a portion of a dimple or plurality of dimples corresponding to the dimple pattern of the mold cavity. Additional examples of outer perimeter vent shapes are found in a description of the outer shapes of retractable sleeves in U.S. Pat. No. 6,129,881, which is incorporated herein in its entirety. The cross-sectional curvature of the retractable sleeves described in that application may apply here as well.

With respect to the embodiment illustrated in FIG. 6, the enlarged vent pin is formed of two pin sections that mate to form at least one primary vent along the interior of the vent pin that is in fluid communication with at least one secondary vent that extends along the interior of the split vent pin from the tip to the base. The vent pin also may have at least one primary vent on the outer surface of the vent pin. The primary vent on the outer surface may be in fluid communication with a secondary vent that travels either down the outer surface of the vent pin or through the interior of the vent pin until reaching the base of the vent pin.

Figure 9:
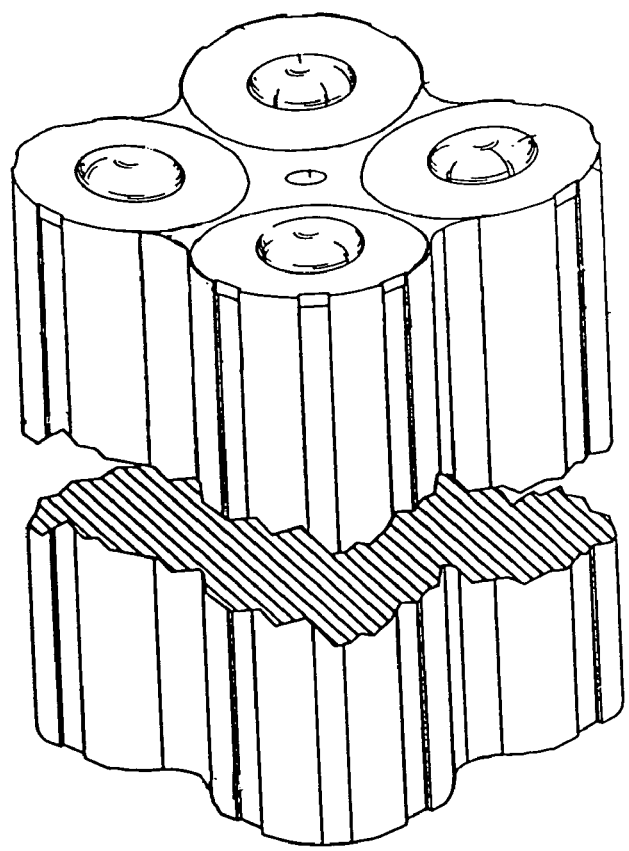
FIG. 9 is a perspective view of an alternative embodiment of a vent pin according to the present invention.

As illustrated in FIG. 6, a plurality of primary vents in fluid communication with a plurality of secondary vents on the outer surface of the vent pin may be used to further increase venting capacity. In fact, the increased ventilation capacity obtained by using a plurality of primary and secondary vents on the outer surface of an enlarged vent pin may result in such a significant increase of ventilation capacity that the vent pin may not need to be formed of two or more sections that join to form an interior vent. Instead, the vent pin may be one-piece without any venting along the interior of the pin. Alternatively, as shown in FIG. 9, the vent pin may have at least one bore disposed within the pin to further increase venting capacity.

While the Figures and embodiments discussed herein use two pin sections to simplify illustration of the invention, one skilled in the art would understand that additional pin sections may be utilized according to the particular application at hand without deviating from the invention described herein. As explained above, for instance, increasing the number of pin sections used may further increase ventilation capacity of the pin when the vent is formed by roughening the face or faces of the pins. In addition, one skilled in the art would also appreciate that the pin sections may be made by a wide variety of manufacturing techniques without departing from the spirit of the invention. For example, the pin sections may be extruded to correspond to the desired cross section or formed by a molding process. Under these alternative examples of manufacturing a pin section, it is possible to form the vent geometry at the same time that the pin section is being manufactured, thereby reducing manufacturing costs.

As mentioned above, the primary vent formed on the inside of the vent pill may be combined with any additional primary vent to further increase ventilation capacity. Thus, a split vent pin may be configured so that the primary vent formed on the inside of the pin is combined with a second primary vent formed on the outer surface of the vent pin, such as flattened side or a vent tip having an outer diameter slightly smaller than the diameter of the pin hole in the mold cavity so that a circular gap forms between the vent tip and the wall of the pin hole. It is preferred that each primary vent is in fluid connection with a secondary vent. As shown in FIGS. 3A-D, a secondary vent may be formed along the outer surface of the vent pin or along the interior of the vent pin and multiple secondary vents may be used for a single pin.

Use of a golf ball injection mold having a split vent pin first involves securing a golf ball core inside a mold, such as by holding the ball in place with a plurality of retractable pins. Once the ball core is properly secured, the layer material is injected into the mold cavity, which can be injected at a higher injection speed because of the improved ventilation capacity of the split vent pin. Trapped air and gasses escape the mold cavity through the split vent pin. Once the injection of layer material is complete, the mold can be opened and the ball removed for further processing.

The balls typically are removed from the mold by striking the retractable pins against the newly formed surface of the ball until the ball is dislodged from the mold. In order to prevent the retractable pins from damaging the newly formed layer, the present invention may be used to force air back into the mold during ejection of the balls from the mold after the layer material has been formed around the ball. The increased ventilation capacity allows for increased air ejection pressure to be exerted on the ball, thereby reducing the impact force required of the retractable pins to release the ball from the mold.

Figure 5:
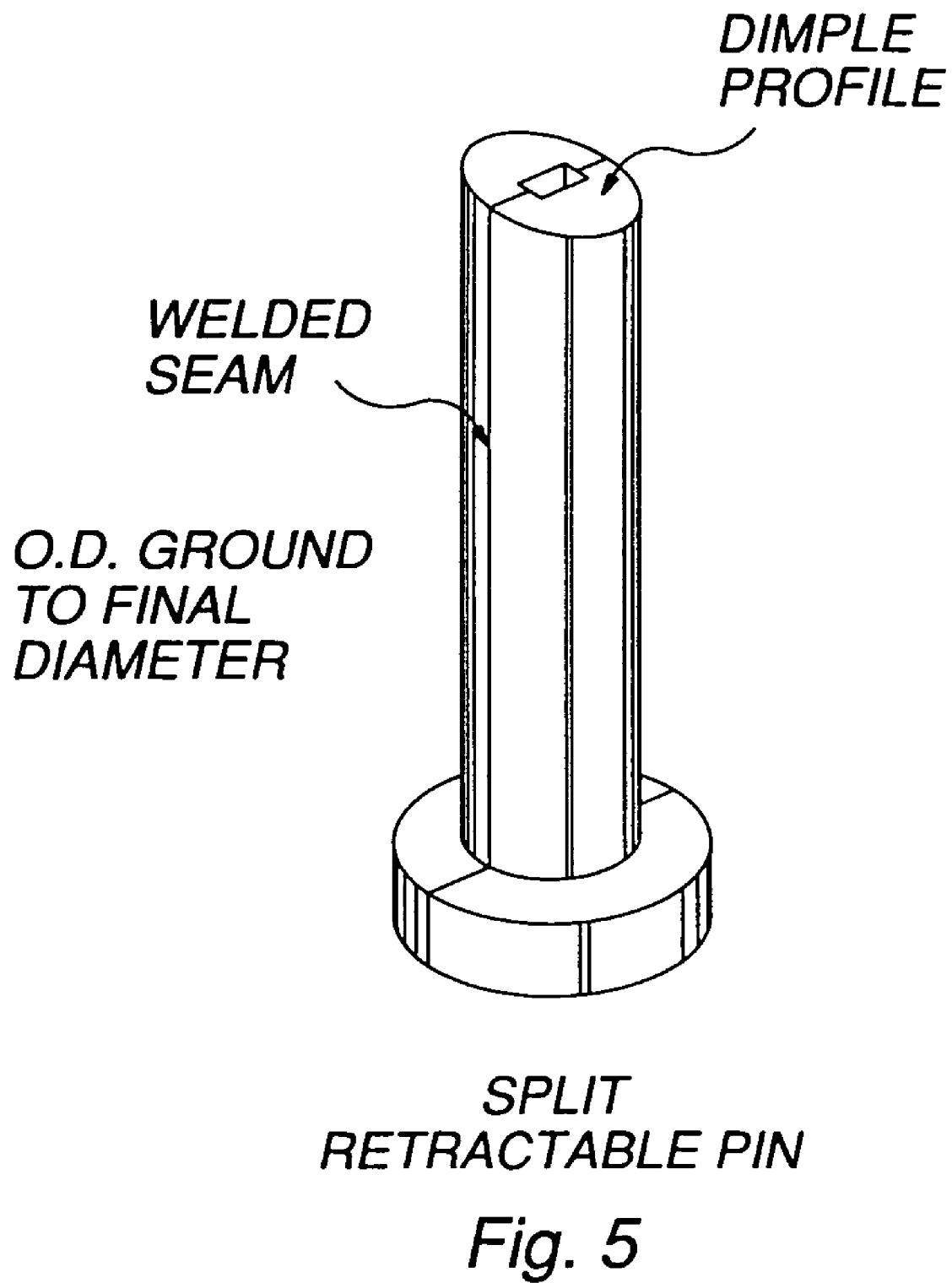
FIG. 5 is an assembled split retractable pin according to the present invention.

In addition to utilizing the present invention for a vent pin, the embodiments described above also may be adapted for use with retractable pins that support the ball during injection of the golf ball layer. FIG. 5 illustrates a split retractable pin having a primary vent that extends from the face of the retractable pin to the base so that trapped air and gasses may be vented through the interior of the retractable pin. The result is further increased ventilation capacity for the mold during at least the initial stages of the mold cycle. Moreover, if a retractable pin is not disengaged from the ball until after injected layer material has surrounded the pin, trapped air and gasses in the void formed by retracting the pin can evacuate the mold down an interior vent rather than escaping through the limited space between the outer surface of the retractable pin and the retractable pin hole. In addition, a split retractable pin may be used to force air back into the mold to assist in ejecting the balls from the mold.

Depending of the forces imparted on the retractable pins during the injection molding process and ejection process, however, it may be necessary to arrange and configure the split retractable pins to reduce bending or spreading of the pins. For example, after forming the vent on the interior of the retractable pin, the seam of the split retractable pin may be welded and finish ground to a desired size corresponding to the pin hole in the mold. Additionally, if two pin sections are used to form the retractable pin, the faces of the pin sections may be positioned such that the seam is approximately in a plane that travels through the poles of the ball. In this configuration, the direction of forces imparted on a retractable pin engaged against the core during injection of material or against the ball during ejection will approximately coincide with the plane between the pin sections so that shearing forces along the faces of the pin sections will be minimized.

Over time and with use, the vents on the interior of the pin may become clogged by impurities or debris. The clogged debris or impurities can be removed quickly and easily by removing the split pin and opening it (if the seam is not welded) to expose the faces of the pin sections that form the vents and cleaning the interior in any suitable manner, such as by blowing the exposed faces with compressed air or scrubbing with a brush. Once the blocked section of the mold is cleared, the mold can be reassembled and put back into operation. Alternatively, the clogged split pin can simply be replaced with a clean pin so that the blocked pins can be cleaned at a later time.

Although the present invention has been fully described by way of examples with reference to accompanying drawings, it is to be noted here that various changes and modifications will be apparent to those skilled in the art. The present invention is not limited to the examples provided and discussed herein. Therefore, unless such changes and modifications depart from the scope of the present invention, they should be construed as being included therein. For example, the number and location of primary and secondary vents, both inside the pin and outside, can vary according to the particular mold and desired venting capacity. In addition, the number and shape of pin sections may be modified accordingly.

We claim:

1. A method of forming a golf ball layer comprising the following steps:
   securely positioning a golf ball core into an injection mold, wherein the core is securely positioned in the injection mold by a plurality of retractable pins, wherein at least one retractable pin comprises a first retractable pin section with a first face and a second retractable pin section with a second face such that when the faces are joined they define a primary vent at the tip of the retractable pin;
   injecting layer material into the mold; and
   venting air and gasses from the mold through a split vent pin, wherein said split vent pin comprises a first pin section having a first face and a second pin section having a second face such that when the faces of the first and second pin sections are joined they define a primary vent along the inside of the tip of the split vent pin.

2. The method of forming a golf ball layer according to claim 1 further comprising the step of forcing a gas into the injection mold after the golf ball layer is formed to assist in ejecting the golf ball from the mold.

3. The method of forming a golf ball layer according to claim 2, wherein the gas forced into the injection mold to assist in ejecting the golf ball from the mold travels through the vent pin.

4. The method of forming a golf ball layer according to claim 2 further comprising the step of striking the surface of the ball with at least one retractable pin to assist in ejecting the golf ball from the mold.

5. The method of forming a golf ball layer according to claim 4 further comprising the step of forcing air back into the injection, mold through at least one retractable pin having a primary vent.

6. The method of forming a golf ball layer according to claim 1, wherein the face of at least one pin section is roughened to allow air and trapped gasses to pass therethrough when the first and second pin sections are joined.

7. A method of forming a golf ball layer comprising the following steps:
   securely positioning a golf ball core into an injection mold;
   injecting layer material into the mold; and
   venting air and gasses from the mold through a split vent pin, wherein said split vent pin comprises a first pin section having a first face and a second pin section having a second face such that when the faces of the first and second pin sections are joined they define, a primary vent along the inside of the tip of the split vent pin, and wherein the faces of the pin sections join to define a plurality of apertures on the face of the tip of the vent pin, and wherein the tip of the pin is shaped to form a plurality of dimples in the cover of a golf ball.

8. The method of forming a golf ball layer according to claim 1 wherein said mold comprises:
   a first mold plate defining a first cavity having an inner surface terminating in a first parting line surface; and
   a second mold plate defining a second cavity having an inner surface terminating in a second parting line surface such that the first and second mold plates define a substantially spherical cavity when joined along said parting lines.

9. The method of forming a golf ball layer according to claim 1 wherein said first pin section is retractable and said second pin section is retractable.

10. The method of forming a golf ball layer according to claim 1 wherein said vent pin faces contain a plurality of projections on the face of the pin for forming at least a portion of a plurality of dimples in the golf ball.

11. The A method of forming a golf ball layer comprising the following steps:
   securely positioning a golf ball core into an injection mold;
   injecting layer materiai into the mold; and
   venting air and gasses from the mold through a split vent pin, wherein said split vent pin comprises a first pin section having a first face and a second pin section having a second face such that when the faces of the first and second pin sections are joined they define a primary vent along the inside of the tip of the split vent pin, wherein said vent pin faces contain a plurality of projections on the face of the pin for forming at least a portion of a plurality of dimples in the golf ball; and wherein said vent pin faces further contain a plurality of vents along their perimeters.

* * * * *

UNITED STATES PATENT AND TRADEMARK OFFICE
CERTIFICATE OF CORRECTION

PATENT NO. : 7,341,687 B2 Page 1 of 1
APPLICATION NO. : 11/099495
DATED : March 11, 2008
INVENTOR(S) : Paul A. Puniello and Robert A. Wilson It is certified that error appears in the above-identified patent and that said Letters Patent is hereby corrected as shown below:

On the title page Item (73) "Assignee", the state of residence should be changed from "CT" to -- MA. --

Signed and Sealed this

Twenty-first Day of October, 2008

JON W. DUDAS
*Director of the United States Patent and Trademark Office*